(12) United States Patent
Stewart

(10) Patent No.: US 8,567,472 B2
(45) Date of Patent: Oct. 29, 2013

(54) WIRE TROLLEYS, MOVABLE PARTITION SYSTEMS INCLUDING SUCH WIRE TROLLEYS, AND RELATED METHODS

(75) Inventor: Ivan W. Stewart, Herriman, UT (US)

(73) Assignee: Won-Door Corporation, Salt Lake City, UT (US)

( * ) Notice: Subject to any disclaimer, the term of this patent is extended or adjusted under 35 U.S.C. 154(b) by 0 days.

(21) Appl. No.: 13/185,325

(22) Filed: Jul. 18, 2011

(65) Prior Publication Data

US 2013/0020036 A1    Jan. 24, 2013

(51) Int. Cl.
*E06B 3/48*     (2006.01)
(52) U.S. Cl.
USPC ........................................ 160/84.08; 160/199
(58) Field of Classification Search
USPC ........ 160/196.1, 331, 188, 348; 248/74.1, 53, 248/58, 62, 63; 104/288, 115; 254/389, 254/391, 393; 191/12 R; 174/69; 105/148–156
See application file for complete search history.

(56) References Cited

U.S. PATENT DOCUMENTS

| | | | |
|---|---|---|---|
| 1,378,667 A | 5/1921 | Eckert | |
| 2,122,988 A | 7/1938 | Nelson | |
| 2,364,477 A | 12/1944 | Sayles et al. | |
| 2,571,832 A * | 10/1951 | Chapin, Jr. | 191/12 R |
| 2,853,026 A * | 9/1958 | Paul | 105/150 |
| 2,854,680 A * | 10/1958 | Wilson | 15/53.2 |
| 2,858,381 A * | 10/1958 | Goldberg et al. | 191/12 R |
| 2,893,518 A * | 7/1959 | Vanderbeck | 188/42 |
| 3,802,351 A * | 4/1974 | Pascuzzi | 105/150 |
| 3,859,451 A * | 1/1975 | Saunders et al. | 426/656 |
| 4,078,769 A * | 3/1978 | Wamfler | 384/54 |
| 4,387,887 A | 6/1983 | Gentry | |
| 4,702,175 A * | 10/1987 | Brudereck et al. | 105/154 |
| 4,834,161 A | 5/1989 | Johnson et al. | |
| 4,924,929 A | 5/1990 | Johnson et al. | |
| 5,322,132 A * | 6/1994 | Franks, Jr. | 174/41 |
| 5,638,639 A | 6/1997 | Goodman et al. | |
| 5,676,189 A * | 10/1997 | Zeeb | 160/331 |
| 6,662,848 B2 | 12/2003 | Goodman et al. | |
| 7,050,283 B2 | 5/2006 | Field et al. | |
| 7,066,297 B2 | 6/2006 | Goodman et al. | |
| 7,190,132 B2 | 3/2007 | Goodman et al. | |
| 7,478,663 B2 | 1/2009 | Goodman et al. | |
| 7,513,293 B2 | 4/2009 | Goodman et al. | |
| 7,656,129 B2 | 2/2010 | Banta et al. | |
| 7,737,860 B2 | 6/2010 | Banta et al. | |

(Continued)

FOREIGN PATENT DOCUMENTS

DE     10009245    *    9/2001

*Primary Examiner* — Blair M. Johnson
(74) *Attorney, Agent, or Firm* — TraskBritt

(57) ABSTRACT

Wire trolleys for use with a movable partition system comprise a wire-supporting member through which wire may be inserted. At least one roller configured for insertion into a track along which a movable partition extends is connected to the wire-supporting member. Movable partition systems comprise a track. A movable partition comprising at least two sheets of panels extending at least substantially parallel to one another and distanced from one another to define an interior space between the at least two sheets of panels are suspended from and movable along the track. At least one wire trolley located in the interior space between a proximal end and a distal end of the at least two sheets of panels comprises at least one roller in rolling engagement with the track and a wire-supporting member at least partially supporting at least one wire inserted through the wire-supporting member.

23 Claims, 7 Drawing Sheets

(56) References Cited

U.S. PATENT DOCUMENTS

| | | |
|---|---|---|
| 7,740,046 B2 | 6/2010 | Goodman et al. |
| 7,782,019 B2 | 8/2010 | Banta et al. |
| 7,845,384 B2 | 12/2010 | Goodman et al. |
| 7,845,385 B2 | 12/2010 | Goodman et al. |
| 7,845,386 B2 | 12/2010 | Coleman et al. |
| 7,854,248 B2 | 12/2010 | Coleman et al. |
| 7,874,341 B2 | 1/2011 | Coleman et al. |
| 7,886,804 B2 | 2/2011 | Goodman et al. |
| 7,926,538 B2 | 4/2011 | Coleman et al. |
| 7,931,067 B2 | 4/2011 | Goodman et al. |
| 8,448,687 B2 * | 5/2013 | Saccomanno ............. 160/84.02 |
| 2008/0115896 A1 | 5/2008 | Goodman |
| 2009/0108146 A1 * | 4/2009 | Svette et al. .................... 248/56 |
| 2010/0084518 A1 * | 4/2010 | Davis et al. .................. 248/68.1 |
| 2010/0102764 A1 | 4/2010 | Banta et al. |
| 2010/0214709 A1 | 8/2010 | Hall et al. |
| 2010/0299889 A1 | 12/2010 | George |
| 2011/0000625 A1 | 1/2011 | George |
| 2011/0005689 A1 | 1/2011 | Coleman et al. |
| 2011/0024061 A1 | 2/2011 | Bell et al. |
| 2011/0036016 A1 | 2/2011 | Knight et al. |
| 2011/0036509 A1 | 2/2011 | Goodman et al. |
| 2011/0036513 A1 | 2/2011 | Banta et al. |
| 2011/0061820 A1 | 3/2011 | Coleman et al. |
| 2011/0088322 A1 | 4/2011 | Coleman et al. |
| 2011/0093095 A1 | 4/2011 | Goodman et al. |
| 2011/0247275 A1 | 10/2011 | Coleman et al. |
| 2012/0012259 A1 | 1/2012 | Goodman |
| 2012/0061527 A1 * | 3/2012 | Spies et al. ....................... 248/58 |
| 2013/0020033 A1 * | 1/2013 | Saccomanno ............. 160/84.04 |

\* cited by examiner

WIRE TROLLEYS, MOVABLE PARTITION SYSTEMS INCLUDING SUCH WIRE TROLLEYS, AND RELATED METHODS

CROSS-REFERENCE TO RELATED APPLICATION

The subject matter of this application is related to the subject matter of U.S. patent application Ser. No. 13/185,303 to Saccomanno, filed Jul. 18, 2011, now U.S. Pat. No. 8,448, 687, issued May 28, 2013, titled "WIRE SUPPORTS, MOVABLE PARTITION SYSTEMS INCLUDING SUCH WIRE SUPPORTS, AND RELATED METHODS," the disclosure of which is incorporated herein in its entirety by this reference.

FIELD

Embodiments of the disclosure relate generally to wire trolleys for movable partition systems, movable partition systems including such wire trolleys, and related methods. Specifically, embodiments of the disclosure relate to wire trolleys for suspending wires extending within a space between two movable partitions.

BACKGROUND

Movable partitions are utilized in numerous situations and environments for a variety of purposes. Such partitions may include, for example, foldable or collapsible doors configured to close off an opening in order to enclose a room or to subdivide a single large room into one or more smaller rooms. The subdivision of one or more larger areas may be desired, for example, to accommodate the simultaneous meeting of multiple groups in different areas of a larger partitioned space. In some applications, movable partitions are useful for providing privacy and noise reduction. In some applications, movable partitions are useful for providing a barrier, such as, for example, a security barrier or a fire barrier.

A partition system may further include electrical wires extending from one end of a movable partition to an opposite end of the movable partition. For example, wires may connect an AC or DC electrical power supply at one end of a movable partition to a drive motor for extending and retracting the movable partition at an opposing end of the movable partition. In addition, wires may be used to electrically interconnect various components (e.g., switches, sensors, and controllers) of one or more electronic systems of the partition system, such as alarm systems, partition-monitoring systems, and partition control systems. In previously known partition systems, wires have been located in a space within the movable partition between two parallel extending sheets of folding panels that together define the movable partition. Wires are typically connected to individual panels of one of the sheets of folding panels using clips, which support the wires as they extend from one end of the partition to the opposing end of the partition. Thus, the wires are coupled to the interior surfaces of the folding panels, and bend in conformity with the panels in an accordion-style fashion as the movable partition is extended and retracted.

BRIEF DESCRIPTION OF THE DRAWINGS

While the specification concludes with claims particularly pointing out and distinctly claiming what are regarded as embodiments of the invention, various features and advantages of disclosed embodiments may be more readily ascertained from the following description of some example embodiments when read in conjunction with the accompanying drawings, in which:

DETAILED DESCRIPTION

The illustrations presented herein are not meant to be actual views of any particular wire trolley, movable partition system, or component thereof, but are merely idealized representations that are employed to describe example embodiments. Thus, the drawings are not necessarily to scale and relative dimensions may have been exaggerated for the sake of clarity. Additionally, elements common between figures may retain the same or similar numerical designation.

Embodiments of the disclosure relate generally to wire trolleys for movable partition systems, movable partition systems including such wire trolleys, and related methods. Specifically, embodiments of the disclosure relate to wire trolleys for suspending wires extending within a space between two movable partitions.

Figure 1:
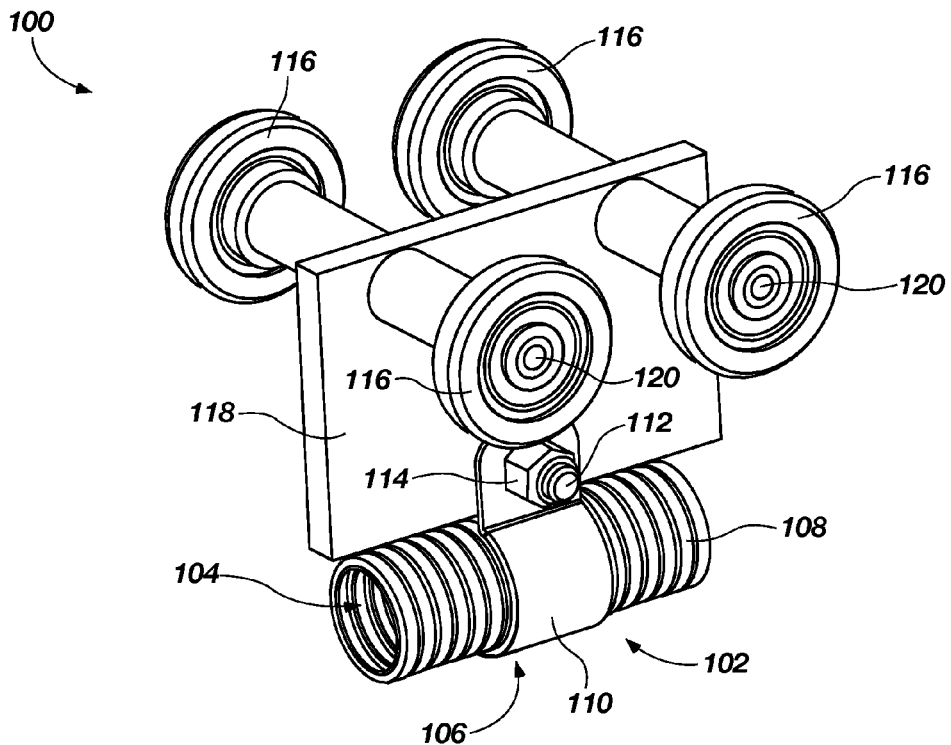
FIG. 1 is a perspective view of a wire trolley.

Referring to FIG. 1, a perspective view of a wire trolley 100 is shown. The wire trolley 100 includes a wire-supporting member 102 through which wire may be inserted and from which wire may be suspended. For example, the wire-supporting member 102 may include a space 104 through which wire may extend and a supporting structure 106 located below the space 104 from which the wire may be suspended. The wire-supporting member 102 may comprise a section of corrugated conduit 108 secured by a conduit clamp 110 in some embodiments. The section of corrugated conduit 108 may extend through the conduit clamp 110, and a securing member may constrict the conduit clamp 110 around the section of corrugated conduit 108 to hold the corrugated conduit 108 in place. For example, a bolt 112 and lock-nut 114, a pin connection, a screw, or other securing members known in the art may be used to constrict the conduit clamp 110 or otherwise hold the corrugated conduit 108 in place. In other embodiments, the wire-supporting member 102 may comprise a loop, an eyelet, a grommet, a section of non-corrugated conduit, a hook, or any other structure known in the art through which wire may be inserted and from which wire may be suspended.

The wire trolley 100 also includes at least one roller 116 connected to the wire-supporting member 102. Rollers 116 of the wire trolley 100 may be sized and configured for insertion into a track along which a movable partition extends. As shown in FIG. 1, the wire trolley 100 may comprise two pairs of rollers 116, each pair of rollers 116 including a first roller 116 located on a first side of the wire-supporting member 102 and a second roller 116 located on a second, opposing side of the wire-supporting member 102. The rollers 116 may be connected to the wire-supporting member 102 using a frame member 118. The frame member 118 may comprise a structure extending between the rollers 116 and the wire-supporting member 102 and vertically distancing the rollers 116 from the wire-supporting member 102. For example, the frame member 118 may comprise a rectangular section of sheet metal to which the rollers 116 and the wire-supporting member 102 are attached. The wire-supporting member 102 may be connected to the frame member 118 by connecting a securing member (e.g., the bolt 112 and lock-nut 114) to the frame member 118.

The rollers 116 may be connected to the frame member 118 using roller attachment hardware 120. For example, the roller attachment hardware 120 may comprise pins, bolts, protrusions on the frame member 118 over which the rollers 116 may snap, or other hardware known in the art that enables rolling attachment of the rollers 116 to the frame member 118. The rollers 116 may comprise, for example, wheels or bearings. In embodiments where the rollers 116 comprise wheels, the rollers 116 may also include bearings attached to or formed integrally with the support rollers 116, such as, for example, ball bearings configured to bear the weight of wire supported by the wire trolley 100 and other vertical forces and force components acting on the wire trolley 100 while enabling the rollers 116 to rotate. Alternatively, the rollers 116 may rotate about the roller attachment hardware 120, such as, for example, bolts that also act as axles for the rollers 116. The rollers 116 may be detachable from the frame member 118, enabling a user to swap the rollers 116, the attachment hardware 120, or the rollers 116 and the attachment hardware 120 for other rollers, attachment hardware, or rollers and attachment hardware compatible with other tracks, such as, for example, standard track sizes and configurations known in the art.

Figure 2:
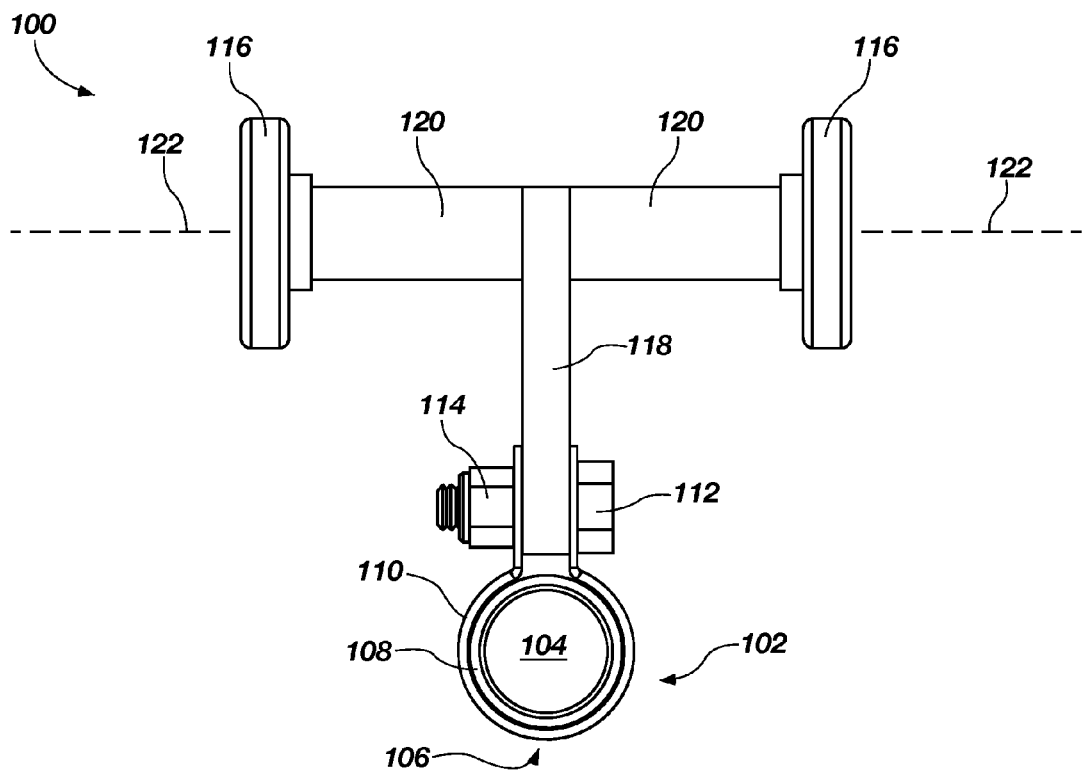
FIG. 2 depicts a front view of the wire trolley of FIG. 1.
Figure 3:
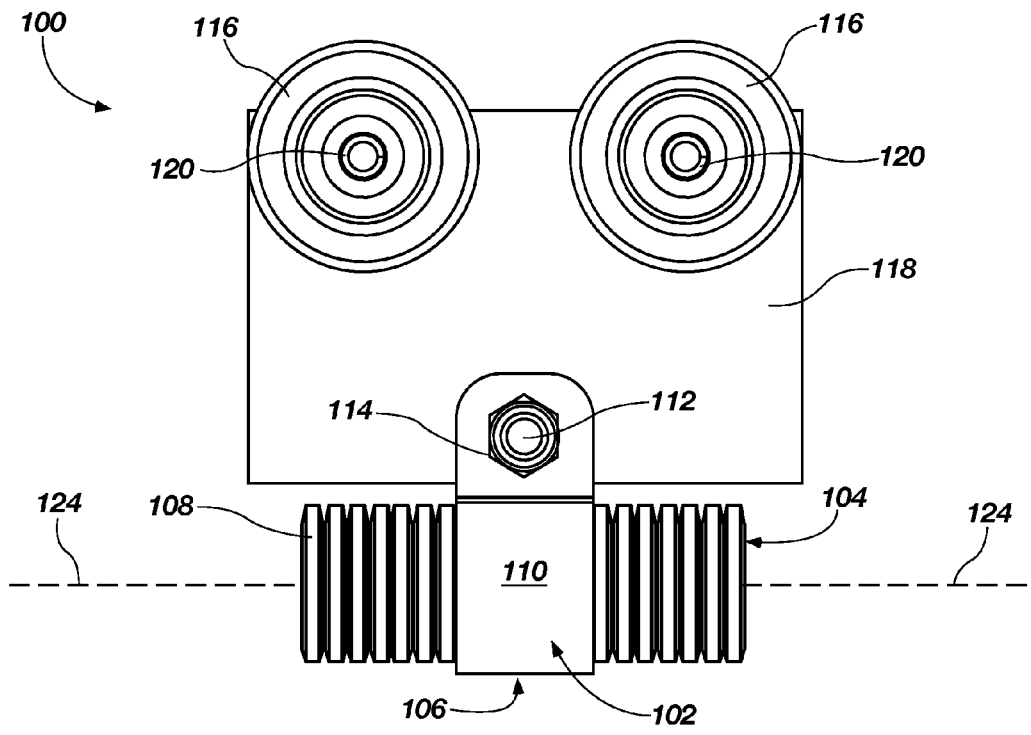
FIG. 3 illustrates a side view of the wire trolley of FIG. 1.

Referring to FIGS. 2 and 3, a front view and a side view of the wire trolley 100 of FIG. 1 are shown, respectively. As best shown in FIG. 2, axes of rotation 122 of the rollers 116 may extend in a direction at least substantially perpendicular to a direction in which the wire trolley 100 is configured to move when suspended from a track. As best shown in FIG. 3, a central axis 124 of the space 104 through which wire may extend may extend in a direction at least substantially parallel to a direction in which the wire trolley 100 is configured to move when suspended from a track. Accordingly, axes of rotation 122 of the rollers 116 may extend in a direction transverse to a direction in which a central axis 124 of the space 104 extends.

Figure 4:
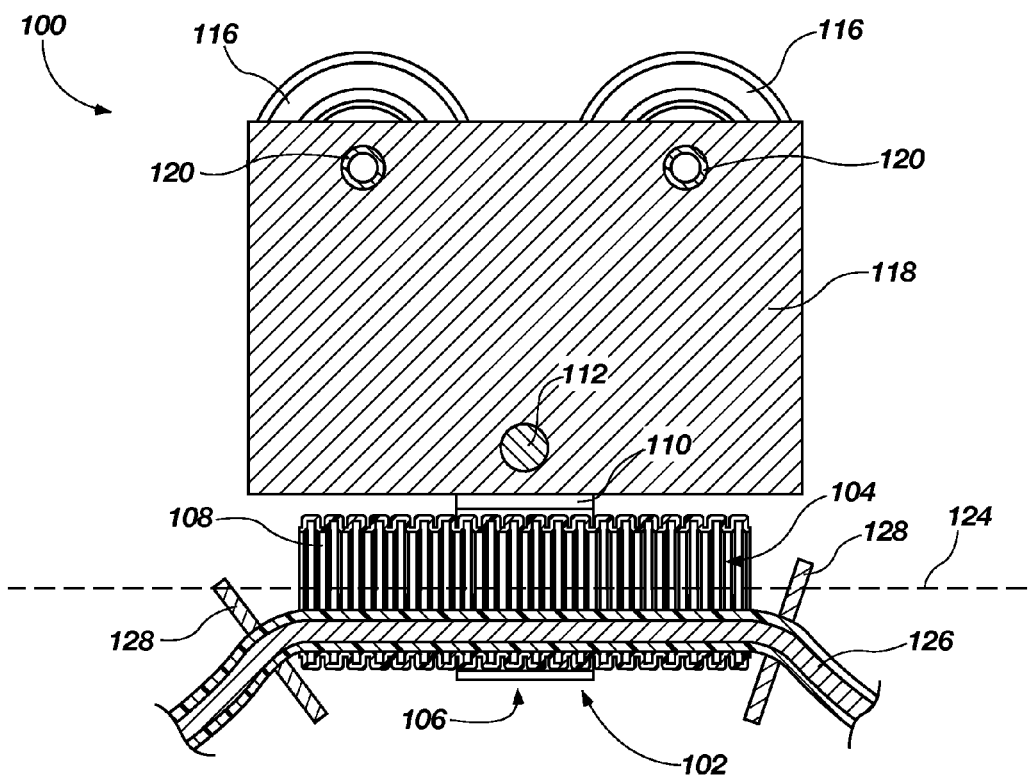
FIG. 4 is a cross-sectional view of the wire trolley of FIG. 1 supporting a wire.

Referring to FIG. 4, a cross-sectional view of the wire trolley 100 of FIG. 1 supporting a wire 126 is shown. The wire 126 is inserted through the space 104 in the wire-supporting member 102 and is supported by the supporting structure 106, including the section of corrugated conduit 108 and the conduit clamp 110. Retaining members 128 may be secured around the wire 126 and may maintain the wire 126 in at least substantially the same position during displacement of the wire trolley 100. In the absence of retaining members 128, the wire 126 may shift through the space 104 in the wire-supporting member 102 as the wire trolley 100 is displaced, leaving a longer length of wire 126 on one side of the wire trolley 100 than was previously on that side of the wire trolley 100. Thus, the retaining members 128 may be used to maintain the lengths of wire 126 disposed on each side of the wire trolley 100 at their respective lengths and prevent the wire 126 from shifting through the space 104 in the wire-supporting member 102. The retaining members 128 may comprise, for example, washers having a diameter larger than a diameter of the space 104 through which the wire 126 extends or other structures known in the art that are connectable to the wire, that may be affixed in position to the wire 126 at a desired location along a length of the wire 126, and that are larger than the diameter of the space 104 through which the wire 126 extends.

Figure 5:
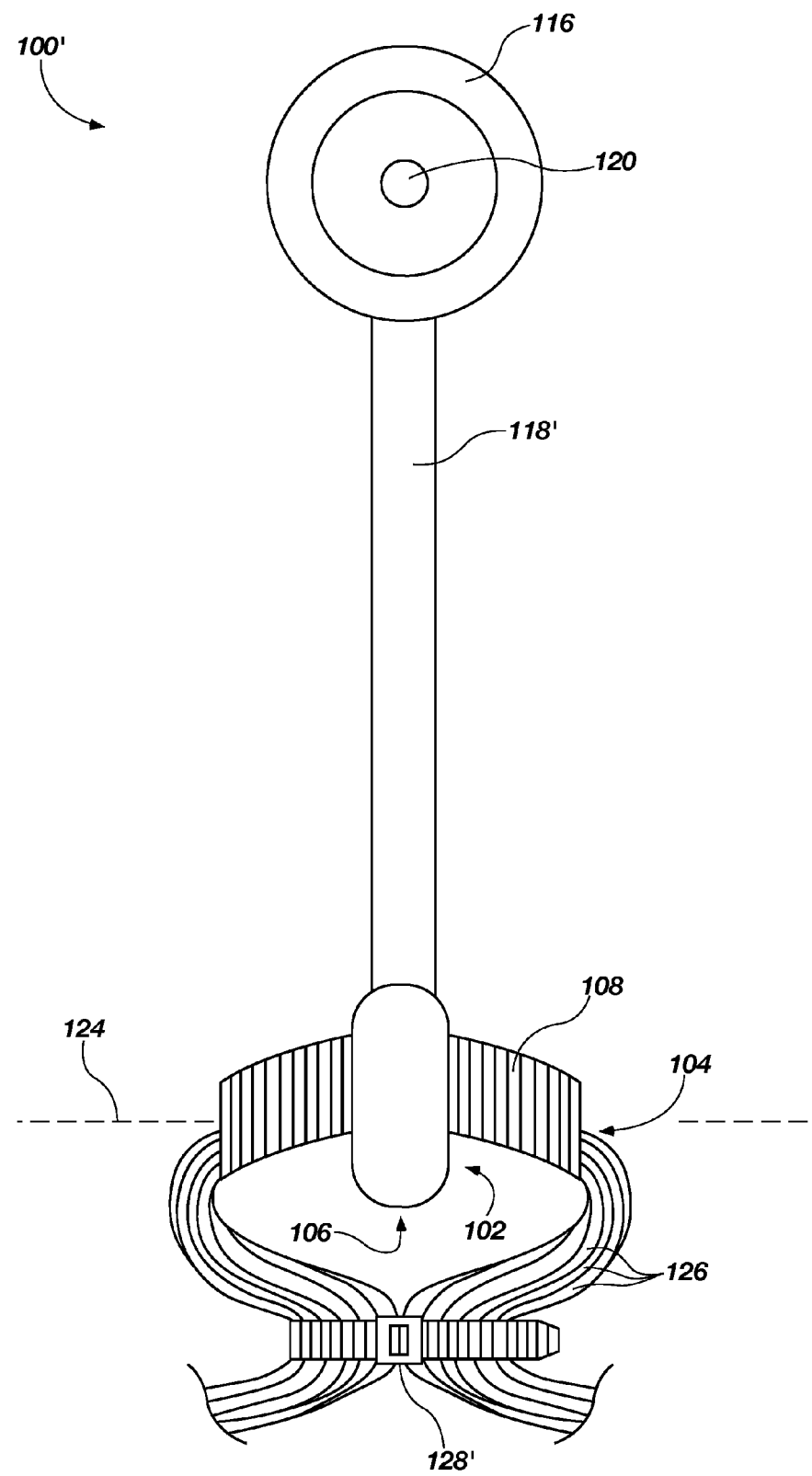
FIG. 5 depicts a side view of another embodiment of a wire trolley.

Referring to FIG. 5, a side view of another embodiment of a wire trolley 100' is shown. The wire trolley 100' comprises a single pair of rollers 116 including a first roller 116 located on a first side of the wire-supporting member 102 and a second roller 116 located on a second, opposing side of the wire-supporting member 102. Wire 126 extending through the wire-supporting member 102 may enable the rollers 116 to roll within a track while reducing jamming of the wire trolley 100' (e.g., due to axles of the rollers 116 becoming oriented at an oblique angle and the rollers 116 being forced against surfaces of the track) as compared to a trolley having a single pair of rollers through which wire 126 does not extend. For example, as the wire trolley 100' is displaced along the track, the wire 126 extending through the wire-supporting member 102 may exert an opposing force to a twisting force that may otherwise cause the rollers 116 to impinge against the track and become jammed. A frame member 118' may comprise, for example, a shaft extending between the rollers 116 and the wire-supporting member 102. The frame member 118' may have a cross-section of any shape, such as, for example, circular, oval, rectangular, square, polygonal, and irregular. The wire-supporting member 102 may comprise a supporting structure 106 comprising, for example, a loop of an eyebolt and a section of corrugated conduit 108 inserted through and retained by the loop. A plurality of wires 126 may be inserted through the space 104 of the wire-supporting member 102. A retaining member 128' may secure portions of the plurality of wires 126 extending from two opposing sides of the wire-supporting member 102 to one another. The retaining member 128' may comprise, for example, a cable tie. Thus, a single retaining member 128' may maintain the lengths of a bundle of wires 126 disposed on each side of the wire trolley 100' at their respective lengths, and prevent the wires 126 from shifting through the space 104 in the wire-supporting member 102.

Figure 6:
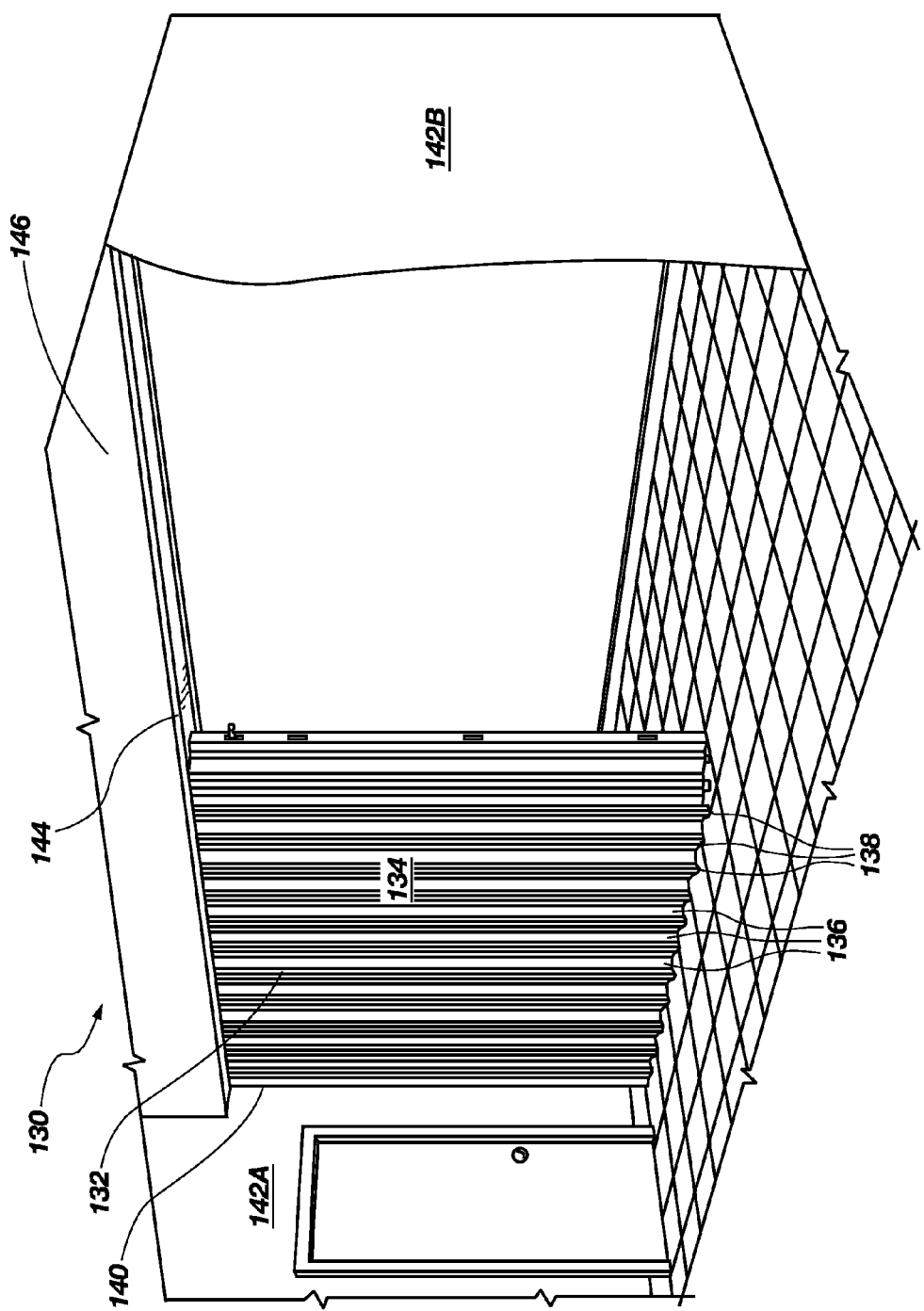
FIG. 6 illustrates a simplified perspective view of a movable partition system.

Referring to FIG. 6, a simplified perspective view of a movable partition system 130 is shown. The movable partition system 130 may be an automatic movable partition system, in that the movable partition system 130 includes a movable partition 132 that may be automatically extended, automatically retracted, or both automatically extended and automatically retracted. The movable partition 132 also may be manually extended, manually retracted, or both manually extended and manually retracted. In other words, the movable partition system 130 may be moved both automatically and manually, as desirable. The movable partition 132 may be used for partitioning space, as a sound barrier, as a fire barrier, as a security barrier, for combinations of such purposes, or for other purposes.

The movable partition 132 may comprise, for example, an accordion-type folding door. The movable partition 132 may include two sheets of panels 134 extending at least substantially parallel to one another connected at their ends to define a space between the sheets of panels 134. Each sheet of panels 134 may include a plurality of panels 136 hingedly connected to one another with hinges or other hinge-like members 138, which may comprise separate structures from the panels 136 or may be integrally formed with the panels 136 and interconnected to form the sheet of panels 134. The hinged connection of the panels 136 enables the panels 136 to fold, and the movable partition 132 to collapse, in a plicated manner as the movable partition 132 is retracted, which enables the movable partition 132 to be stored compactly in a pocket 140 formed in a wall 142A of a building when in a retracted state. In other embodiments, the movable partition 132 may comprise a sliding door, or another type of movable partition 132.

When the movable partition 132 is deployed to an extended position, the movable partition 132 is driven along a track 144 across the space to provide an appropriate barrier. The track 144 may comprise an overhead track disposed in a header assembly 146. In such embodiments, the movable partition 132 may be suspended from and movable along the track 144.

Figure 7:
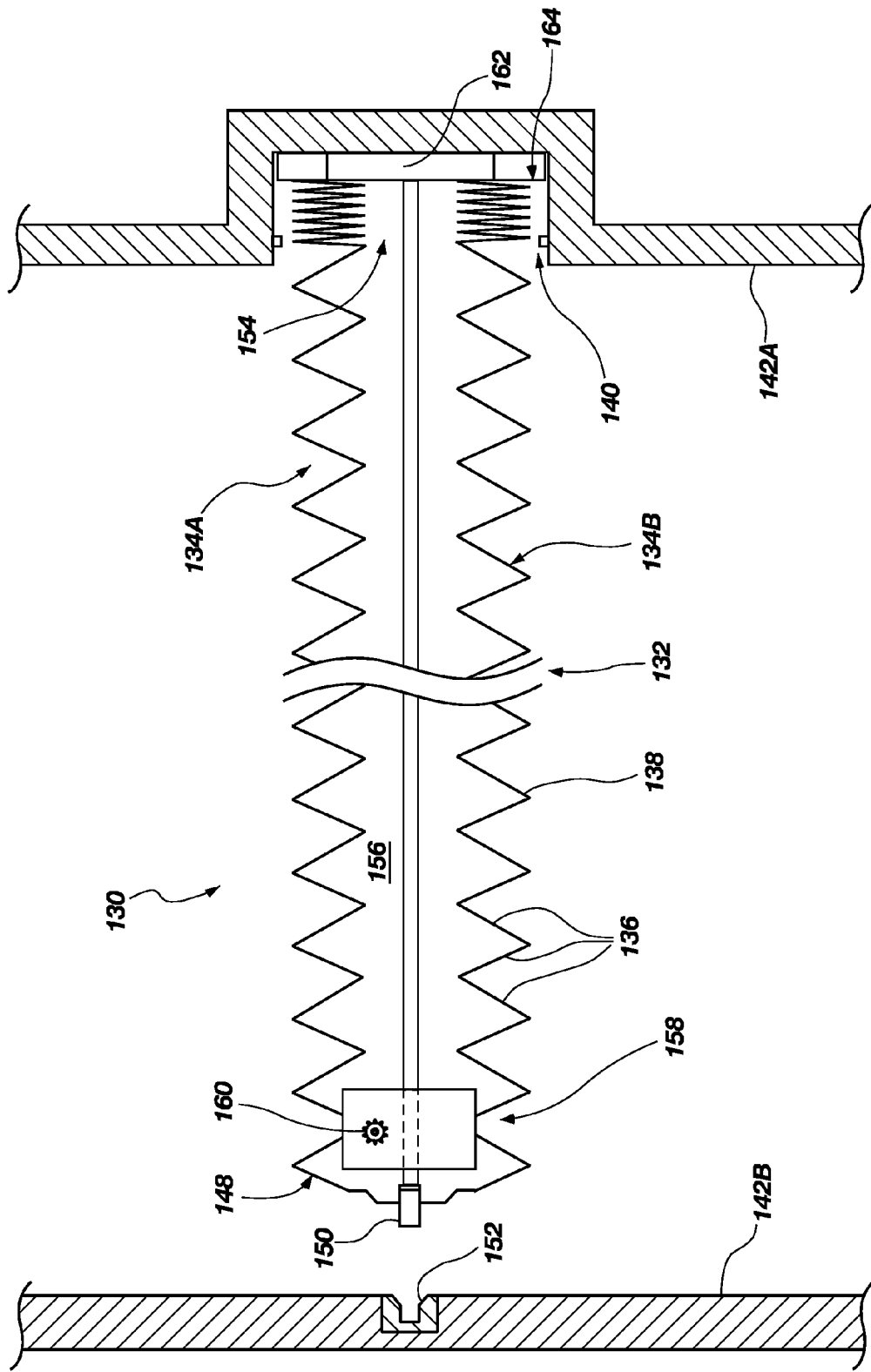
FIG. 7 is a simplified plan view of the movable partition system of FIG. 6.

Referring to FIG. 7, a simplified plan view of the movable partition system 130 of FIG. 6 is shown. A first end 148 of the movable partition 132, which may comprise a lead post 150, may be configured to matingly (i.e., complementarily) engage with a door post 152 that may be formed in another wall 142B of a building when the movable partition 132 is deployed to a fully extended state. A second, opposing end 154 of the movable partition 132 may be located opposite the first end 148 and may be disposed in the pocket 140. In some embodiments, the lead post 150 may matingly engage with a lead post (not shown) of another movable partition assembly (not shown), which may likewise be suspended from the track 144 (see FIG. 6), conventionally known as a "bi-part" configuration. Such an additional movable partition assembly with a lead post (not shown) may also be configured to move automatically and/or manually.

The partition system 130 may include a first sheet of panels 134A and a second sheet of panels 134B laterally spaced from and extending substantially parallel to the first sheet of panels 134A. The first ends 148 of the first and second sheets of panels 134A and 134B may be attached at or near the lead post 150. For example, the first and second sheets of panels 134A and 134B may be attached directly to the lead post 150, may be attached to one another and then to the lead post 150, or may be attached to an intermediate structure that is then attached to the lead post 150. Such a movable partition 132 may be used, for example, as a fire door, wherein one sheet of panels 134A acts as a primary fire and smoke barrier, an interior space 156 between the first sheet of panels 134A and the second sheet of panels 134B acts as an insulator or a buffer, and the second sheet of panels 134B acts as a secondary fire and smoke barrier. Such a configuration may also be useful in providing an acoustic barrier when the movable partition 132 is used to subdivide a larger space into multiple rooms.

In some embodiments, the movable partition system 130 may also include an automatic drive system 158. The drive system 158 may be disposed in the interior space 156 between the first sheet of panels 134A and the second sheet of panels 134B in some embodiments. The drive system 158 may be attached to and carried by the movable partition 132, and may move cooperatively therewith as the movable partition 132 is extended or retracted. In some embodiments, all of the drive components of the movable partition system 130 may be confined between the first sheet of panels 134A and the second sheet of panels 134B.

The automatic drive system 158 may be positioned near the lead post 150 of the partition system 130. The drive system 158 may include a motor (not shown) carried by movable partition 132 as described in detail in U.S. patent application Ser. No. 12/542,448 which was filed Aug. 17, 2009 and is titled "Methods, Apparatuses, and Systems for Driving a Movable Partition," in U.S. patent application Ser. No. 12/758,584, which was filed Apr. 12, 2010, now U.S. Pat. No. 8,365,796, issued Feb. 5, 2013, and is titled "Methods, Apparatuses, and Systems for Movable Partitions," and in U.S. patent application Ser. No. 12/838,235, which was filed Jul. 16, 2010, now U.S. Pat. No. 8,443,866, issued May 21, 2013, and is titled "Methods, Apparatuses, and Systems for Movable Partitions," the disclosure of each of which is hereby incorporated herein in its entirety by this reference. Briefly, the automatic drive system 158 may be configured to automatically open, automatically close, or to both automatically open and automatically close the movable partition 132 upon actuation thereof. The drive system 158 may include an elongated drive member 184 (see FIG. 9), which may comprise, for example, a chain, belt, cable or rope having fixed ends. A rotatable drive member 160, such as, for example, a pulley, wheel, cog, or sprocket, may be configured to engage the elongated drive member 184 such that when the rotatable drive member 160 is rotated, the rotatable drive member 160 moves along the elongated drive member 184 causing the movable partition 132 to automatically extend to a deployed state or automatically retract to a collapsed state.

In other embodiments, the drive system 158 may comprise a motor or other actuator for extending a movable partition fixedly located in the pocket 140. For example, a drive system as disclosed in U.S. Pat. No. 7,782,019 issued Aug. 24, 2010 to Banta et al., the disclosure of which is incorporated herein in its entirety by this reference, may be used.

The movable partition system 130 may also include a control system 162. The control system 162 may be operatively coupled to the drive system 158 (e.g., by using a wire 126 or a plurality of wires 126 as shown in FIGS. 4 and 5) and may control, for example, actuation of the automatic drive system 158 to extend and retract the movable partition 132. The control system 162 may be located at or near the second, opposing end 154 of the movable partition 132. For example, the control system 162 may be located in the pocket 140. The second, opposing ends 154 of the first and second sheets of panels 134A and 134B may be connected to a floating jamb 164, which may also be located within the pocket 140, in some embodiments. In other embodiments, the second, opposing ends 154 of the first and second sheets of panels 134A and 134B may be connected to a fixed jamb. The control system 162 may be located on a side of the floating jamb 164 opposing the movable partition 132. The control system 162 may comprise, for example, a processor, a power supply, input and output ports, power ports, a battery system, switches, and other components known in the art for controlling the operation of a partition system 130.

Figure 8:
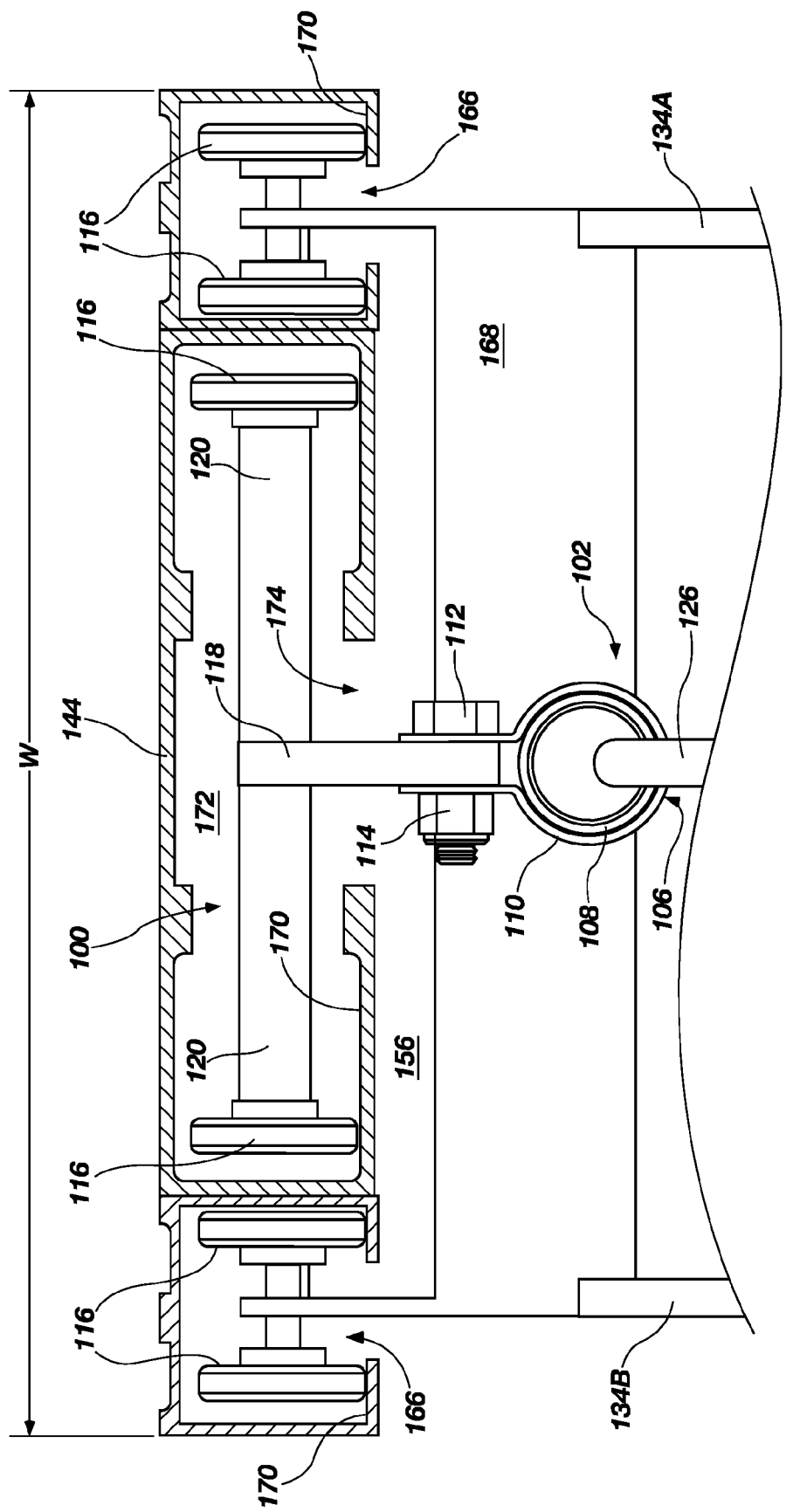
FIG. 8 depicts a cross-sectional view of a track of the movable partition system shown in FIG. 6 and illustrates a movable partition and a wire trolley suspended from the track.

Referring to FIG. 8, a cross-sectional view of the track 144 of the movable partition system 130 shown in FIG. 6 is shown. A wire trolley 100 is illustrated coupled to and suspended from the track 144. The track 144 may comprise an elongated member having a plurality of trolley guide channels extending along a length of the track 144 (e.g., from within a pocket 140 formed in a wall 142A to a door post 152 connected to another wall 142B as shown in FIGS. 6 and 7). For example, the track 144 may comprise lateral trolley guide channels 166. A trolley 168 to which the first and second sheets of panels 134A and 134B are connected at their first ends 148 (see FIG. 7) and from which the sheets of panels 134A and 134B are suspended may include a plurality of rollers 116 disposed in the lateral trolley guide channels 166. The rollers 116 of the trolley 168 may be in rolling engagement with a lower internal surface 170. Thus, the trolley 168 may bear the weight of the movable partition 132 (see FIG. 7) and other vertical forces and vertical force components acting on the movable partition system 130 while enabling the movable partition 132 to extend to a deployed state and retract to a collapsed state as the rollers 116 of the trolley 168 roll within the track 144.

The track 144 may also comprise a chain guide channel 172. The chain guide channel 172 may be located centrally with respect to a width w of the track 144 and may include a lower opening 174. At least one wire trolley 100 may be suspended from the track 144. The wire trolley 100 may be located in the interior space 156 between the second, opposing end 154 and the first end 148 of the movable partition 132 (see FIG. 7). The rollers 116 of the wire trolley 100 may be in rolling engagement with a lower internal surface 170 of the chain guide channel 172. The frame member 118 of the wire trolley 100 may extend through the lower opening 174 into the interior space 156 between the first and second sheets of panels 134A and 134B of the movable partition 132. Thus, wire 126 supported by the wire-supporting member 102 may be located in the interior space 156 between the first and second sheets of panels 134A and 134B. In some embodiments, portions of the automatic drive system 158 (see FIG. 7), such as, for example, the elongated drive member 184 (see FIG. 9), may extend within the chain guide channel 172. In other embodiments, such portions of the automatic drive system 158 may extend in other channels formed in and extending along the track 144.

Figure 9:
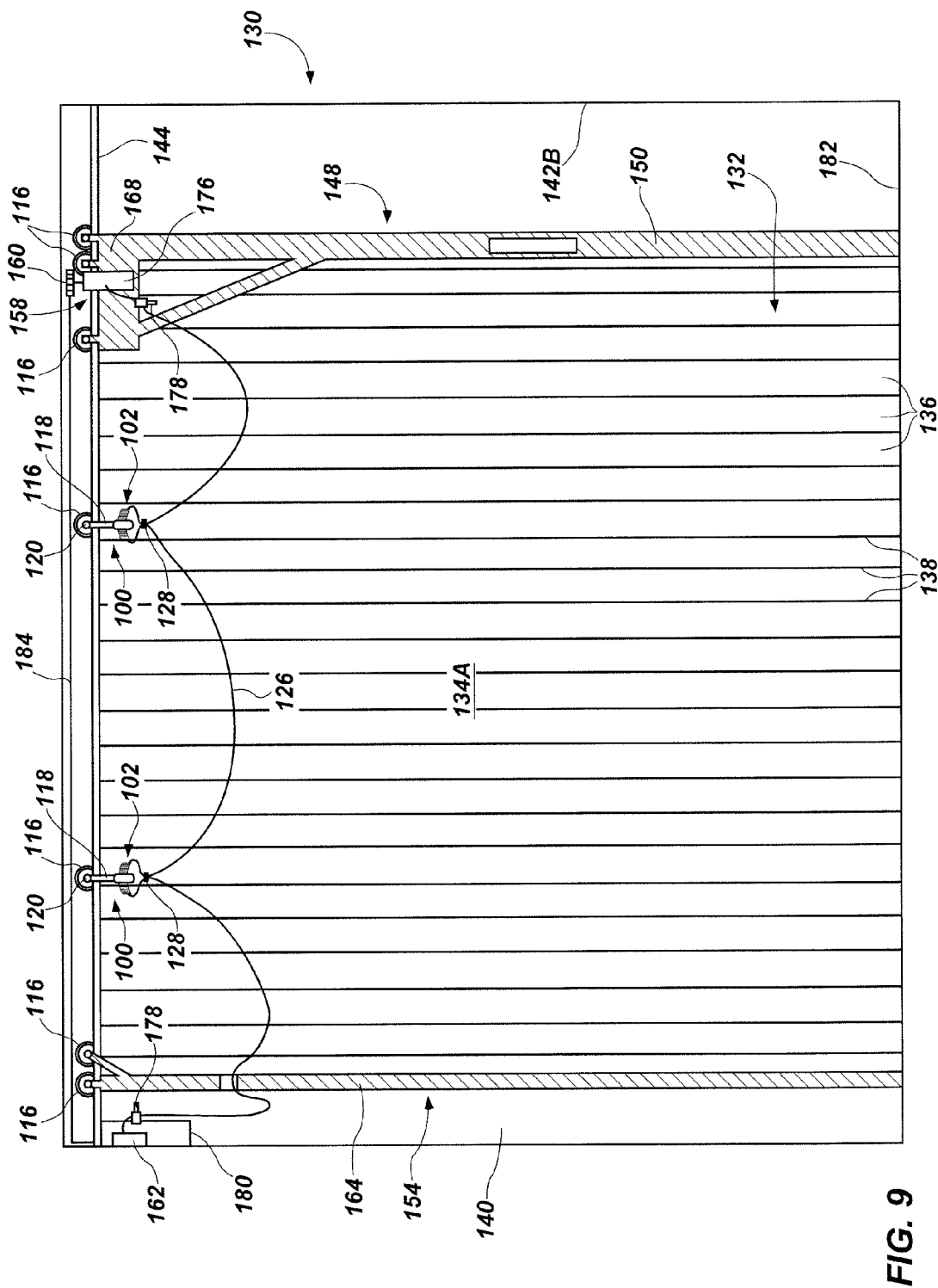
FIG. 9 illustrates a cross-sectional longitudinal view of the movable partition system of FIG. 6 within an interior space defined between two sheets of folding panels of the movable partition and illustrates multiple wire trolleys suspended from the track and supporting one or more wires.

Referring to FIG. 9, a cross-sectional view of the movable partition system 130 of FIG. 6 from within the interior space 156 (see FIGS. 7 and 8) defined between the first and second sheets of panels 134A and 134B (see FIGS. 7 and 8) is shown. When installing the movable partition system 130, at least two sheets of panels 134A and 134B (see FIGS. 7 and 8) extending at least substantially parallel to one another and laterally distanced from one another to define an interior space 156 (see FIGS. 7 and 8) between the first and second sheets of panels 134A and 134B (see FIGS. 7 and 8) may be suspended from the track 144. For example, the first and second sheets of panels 134A and 134B may be connected to a trolley 168 and a floating jamb 164, each of which may be in rolling engagement with the track 144, to form a movable partition 132.

At least one wire trolley 100 comprising at least one roller 116 and a wire-supporting member 102 through which wire 126 may be inserted connected to the at least one roller 116 may be suspended from the track 144 in the interior space 156 (see FIGS. 7 and 8) between the first end 148 and the second, opposing end 154 of the movable partition 132 by rollingly engaging the at least one roller 116 with the track 144. At least one wire 126 located in the interior space 156 (see FIGS. 7 and 8) may extend from the first end 148, through the wire-supporting member 102, and to the second, opposing end 154 of the movable partition 132 in some embodiments. In other embodiments, the wire 126 may extend from a first location within the interior space 156, through the wire-supporting member 102, to another location within the interior space 156. Thus, the wire 126 may extend completely through the movable partition 132 or may extend only partially through the movable partition 132. Portions of the wire 126 may extend beyond the interior space 156 such that the terminal ends of the wire 126 are located outside the interior space 156. Accordingly, at least a portion of the wire 126 may be suspended from and supported by the wire trolley 100. The wire trolley 100 may be configured to support only the wire 126 or the plurality of wires 126, while other electrical components (e.g., the control system 162 and the electric drive motor 176) may be supported by other structures (e.g., the movable partition 132 or a surface of the pocket 140). Thus, the sole electrical component supported by the wire trolleys 100 may be the wire 126, and the wire trolleys 100 may be left free from attachment to any other electrical component in some embodiments. In other embodiments, the wire trolleys 100 may support other electrical components, such as, for example, switches, sensors, electric motors, components of the automatic drive system 158, or other electrical components known in the art for use with a movable partition system 130.

The wire 126 extending in the interior space 156 (see FIGS. 7 and 8) may connect components of the movable partition system 130 to one another. For example, a plurality of wires 126 may extend from a location at or near the first end 148 of the movable partition 132 to a location at or near the second, opposing end 154 of the movable partition 132. The plurality of wires 126 may connect, for example, one of an electric drive motor 176, a switch, a sensor, an alarm, an electrical power source, a control system 162, or other electrical components known in the art for use in a movable partition system 130 to another of the electric drive motor 176, the switch, the sensor, the alarm, the electrical power source, the control system 162, or other electrical components known in the art for use in a movable partition system 130. For example, the plurality of wires 126 may connect an AC or a DC electrical power source to an electric drive motor 176. In addition, the plurality of wires 126 may electrically interconnect switches, sensors, and controllers of one or more electronic systems of the movable partition system 130, such as an alarm system, a monitoring system, and the control systems 162.

As the wire 126 extends in the interior space 156 (see FIGS. 7 and 8), portions of the wire 126 may be supported by components of the movable partition system 130 other than the one or more wire trolleys 100. For example, a portion of the wire 126 located near the second, opposing end 154 of the movable partition 132 may be supported by a relief connection 178 located proximate the second, opposing end 154. For example, the wire 126 may be connected to a control system 162 within the pocket 140 and supported by a relief connection 178 comprising a cable tie or other device for securing a wire 126 to another structure attached to a control box 180 containing the control system 162. As a specific, nonlimiting example, an end of the wire 126 located proximate the second, opposing end 154 of the movable partition 132 may be connected to the control system 162, extend through a hole or gap in the control box 180 into the pocket 140, be secured to the control box 180 using a relief connection 178 (e.g., a cable tie), and extend into the interior space 156 by passing through a hole or gap in the floating jamb 164.

Portions of the wire 126 located between the second, opposing end 154 and the first end 148 of the movable partition 132 may be supported by wire-supporting members 102 of wire trolleys 100 suspended from and movable along the track 144. For example, a wire trolley 100 may be added for at least about every 10 feet (3.05 m) that a movable partition 132 must extend to reach a fully deployed state. Thus, for movable partitions 132 that must extend for between about 10 feet (3.05 m) and about 20 feet (6.10 m) to reach a fully deployed state, at least one wire trolley 100 may support wire 126 extending between the proximal and distal ends 154 and 148 of the movable partitions 132. For movable partitions 132 that must extend for between about 20 feet (6.10 m) and about 30 feet (9.14 m) to reach a fully deployed state, at least two wire trolleys 100 may support wire 126 extending between the first and second, opposing ends 148 and 154 of the movable partitions 132.

Finally, a portion of the wire 126 located near the first end 148 of the movable partition 132 may be supported by a relief connection 178 located proximate the first end 148. For example, an end of the wire 126 may be connected to the electric drive motor 176 located at or near the first end 148 and carried by the movable partition 132 and a portion of the wire 126 proximate the electric drive motor 176 may be supported by a relief connection 178 comprising a cable tie or other device for securing a wire 126 to the automatic drive system 158 containing the electric drive motor 176. Thus, the weight of the wire 126, vertical forces acting on the wire 126, and vertical force components acting on the wire 126 may be supported by components of the movable partition system 130 other than the electrical connections to electrical components, which may reduce strain on the electrical connections.

When the movable partition 132 is in a collapsed state within the pocket 140, the wire 126 may hang from the relief connections 178 and the wire-supporting members 102 of the wire trolleys 100 toward a floor 182 or other bottom surface. For example, the wire 126 may be at least 12 inches (30.48 cm) away from the floor 182, at least 6 inches (15.24 cm) away from the floor 182, or at least 1 inch (2.54 cm) away from the floor 182 at its lowest points when the movable partition 132 is in a fully collapsed state. As the movable partition 132 extends from a collapsed state to a deployed state, the wire trolleys 100 supporting the wire 126 may be pulled along the track 144 by the wire 126 while the lowest points of the wire 126 raise from the floor 182 toward the track 144 so that the wire 126 may maintain the electrical connections between components of the movable partition system 130.

As compared to movable partition systems where wire is connected to one of the sheets of panels using clips to support the wires as they extend from the proximal end to the distal end of the movable partition system, the wire trolleys 100 may enable the wire 126 to provide a more reliable electrical connection because the wire 126 is not forced to repeatedly fold and conform to the accordion-like bending of the sheets of panels 134A and 134B. In addition, the wire trolleys 100 may enable thicker wire 126 to be used because such wire 126 does not have to conform to the accordion-like bending of the sheets of panels 134A and 134B. The wire trolleys 100 may also enable the wire 126 to provide a more reliable electrical connection because air within the interior space 156 acts as a buffer between the wire 126 and surfaces (e.g., panels 136) that may be directly exposed to fire (e.g., when the movable partition 132 acts as a barrier to fire), thereby preventing or delaying damage to the wire 126 during a fire. The wire trolleys 100 may enable shorter lengths of wire 126 to be used because the wire may have a more direct path between the components connected to the wire 126. For example, the wire trolleys 100 may enable a length of wire 126 that is about three-fourths as long, two-thirds as long, or even one-half as long as a length of wire 126 connected to the same movable partition 132 using clips connected to panels 136. The wire trolleys 100 may enable faster and simpler installation because fewer structures (e.g., wire trolleys 100, 100' and relief connections 178) are required to support the wire 126.

While the present invention has been described herein with respect to certain embodiments, those of ordinary skill in the art will recognize and appreciate that it is not so limited. Rather, many additions, deletions, and modifications to the embodiments described herein may be made without departing from the scope of the invention as hereinafter claimed, including legal equivalents. In addition, features from one embodiment may be combined with features of another embodiment while still being encompassed within the scope of the invention as contemplated by the inventor.

CONCLUSION

In some embodiments, wire trolleys for use with a movable partition system comprise a wire-supporting member through which wire may be inserted. At least one roller configured for insertion into a track along which a movable partition extends is connected to the wire-supporting member.

In other embodiments, movable partition systems comprise a track. A movable partition comprising at least two sheets of panels extending at least substantially parallel to one another and laterally distanced from one another to define an interior space between the at least two sheets of panels is suspended from and movable along the track. At least one wire extends in the interior space. At least one wire trolley located in the interior space between a first end and a second, opposing end of the movable partition comprises at least one roller in rolling engagement with the track and a wire-supporting member at least partially supporting the at least one wire inserted through the wire-supporting member.

In further embodiments, methods of installing a movable partition system comprise suspending a movable partition comprising at least two sheets of panels extending at least substantially parallel to one another and laterally distanced from one another to define an interior space between the at least two sheets of panels from a track. At least one wire trolley comprising at least one roller and a wire-supporting member through which wire may be inserted and connected to the at least one roller is suspended from the track in the interior space and between a first end and a second, opposing end of the movable partition by rollingly engaging the at least one roller with the track. At least one wire located in the interior space extends within the interior space through the wire-supporting member.

What is claimed is:

1. A movable partition system, comprising:
    a track;
    a movable partition suspended from and movable along the track by panel rollers located in at least a first channel of the track, the movable partition comprising at least two sheets of panels extending at least substantially parallel to one another and laterally distanced from one another to define an interior space between the at least two sheets of panels;
    at least one wire extending in the interior space; and
    at least one wire trolley located in the interior space between a first end and a second, opposing end of the movable partition, the at least one wire trolley comprising:
        at least one roller in rolling engagement with the track in a second, different channel of the track; and
        a wire-supporting member at least partially supporting the at least one wire, the at least one wire being inserted through the wire-supporting member,
    wherein the only electrical component supported by the at least one wire trolley comprises the at least one wire.

2. The movable partition system of claim 1, further comprising at least one wire trolley for about every 10 feet (3.05 m) that the movable partition must extend to reach a fully deployed state.

3. The movable partition system of claim 1, further comprising one of a floating jamb and a fixed jamb connected to the movable partition at the first end and a lead post connected to the movable partition at the second, opposing end.

4. The movable partition system of claim 1, wherein portions of the at least one wire located proximate the first and second, opposing ends of the movable partition are supported by relief connections securing the portions of the at least one wire to components of the movable partition system.

5. The movable partition system of claim 4, wherein the relief connections comprise cable ties securing the portions of the at least one wire to components of the movable partition system.

6. The movable partition system of claim 4, wherein the relief connections secure a first portion of the at least one wire to an automatic drive system and a second portion of the at least one wire to at least one of a control box, an electrical power source, an alarm system, and a partition monitoring system.

7. The movable partition system of claim 6, wherein a first end of the at least one wire is connected to a control system located within the control box and a second end of the at least one wire is connected to an electric drive motor located within the automatic drive system.

8. The movable partition system of claim 1, wherein portions of the at least one wire extending from two opposing sides of the wire-supporting member are secured to one another.

9. The movable partition system of claim 8, wherein a retaining member secures the portions of the at least one wire extending from two opposing sides of the wire-supporting member to one another.

10. The movable partition system of claim 9, wherein the retaining member comprises a cable tie.

11. The movable partition system of claim 1, further comprising retaining members having a diameter larger than a diameter of a space defined by the wire-supporting member through which the at least one wire extends attached to portions of the at least one wire extending from two opposing sides of the wire-supporting member.

12. The movable partition system of claim 1, wherein at least one end of the at least one wire is connected to at least one of an electric drive motor, a switch, a sensor, an alarm, a control system, and an electrical power source.

13. The movable partition system of claim 1, wherein the at least one wire comprises a plurality of wires.

14. The movable partition system of claim 1, wherein the at least one wire trolley comprises a plurality of wire trolleys.

15. A method of installing a movable partition system, comprising:
    suspending a movable partition from at least a first channel of a track, the movable partition comprising at least two sheets of panels extending at least substantially parallel to one another and laterally distanced from one another to define an interior space between the at least two sheets of panels;
    suspending at least one wire trolley from a second, different channel of the track by rollingly engaging at least one roller of the wire trolley with the track, the at least one wire trolley comprising a wire-supporting member through which wire may be inserted connected to the at least one roller, the at least one wire trolley being located in the interior space and between a first end and a second, opposing end of the movable partition;
    extending at least one wire located in the interior space through the wire-supporting member; and
    leaving the at least one wire trolley free from attachment to any other electrical component.

16. The method of claim 15, wherein suspending the at least one wire trolley comprises suspending a plurality of wire trolleys.

17. The method of claim 15, further comprising suspending at least one wire trolley for about every 10 feet (3.05 m) that the movable partition must extend to reach a fully deployed state.

18. The method of claim 15, further comprising connecting one of a floating jamb and a fixed jamb to the movable partition at the first end and connecting a lead post to the movable partition at the second, opposing end.

19. The method of claim 15, further comprising supporting portions of the at least one wire located proximate the first and second, opposing ends of the movable partition using relief connections securing the portions of the at least one wire to other components of the movable partition system.

20. The method of claim 15, further comprising securing portions of the at least one wire extending from two opposing sides of the wire-supporting member to one another.

21. The method of claim 20, wherein securing the portions of the at least one wire extending from the two opposing sides of the wire-supporting member to one another comprises securing a cable tie around the portions of the at least one wire extending from the two opposing sides of the wire-supporting member.

22. The method of claim 15, further comprising securing retaining members having diameters larger than a diameter of a space defined by the wire-supporting member through which the at least one wire extends to portions of the at least one wire extending from two opposing sides of the wire-supporting member.

23. The method of claim 15, further comprising connecting at least one end of the at least one wire to at least one of an electric drive motor, a switch, a sensor, an alarm, a control system, and an electrical power source.

* * * * *